US009272625B2

(12) United States Patent
Sonesson et al.

(10) Patent No.: US 9,272,625 B2
(45) Date of Patent: Mar. 1, 2016

(54) POWER SUPPLY SYSTEM FOR POWERING AN ELECTRIC LOAD OF A VEHICLE

(71) Applicant: VOLVO CAR CORPORATION, Goeteborg (SE)

(72) Inventors: Mikael Sonesson, Alingsas (SE); Torbjoern Larsson, Goeteborg (SE); Jonas Dahlloef, Moelndal (SE); Peter Gunberg, Trollhaettan (SE); Daniel Midholm, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 598 days.

(21) Appl. No.: 13/721,825

(22) Filed: Dec. 20, 2012

(65) Prior Publication Data

US 2013/0162030 A1    Jun. 27, 2013

(30) Foreign Application Priority Data

Dec. 21, 2011    (EP) .................................... 11194967

(51) Int. Cl.
*B60L 1/00*    (2006.01)
*B60R 16/033*  (2006.01)
(Continued)

(52) U.S. Cl.
CPC ................. *B60L 1/00* (2013.01); *B60L 3/0007* (2013.01); *B60L 3/0046* (2013.01); *B60L 3/04* (2013.01); *B60L 11/14* (2013.01); *B60L 11/1868* (2013.01); *B60R 16/033* (2013.01); *F02N 11/0866* (2013.01); *B60L 2240/547* (2013.01); *B60L 2240/549* (2013.01); *B60R 2021/01252* (2013.01); *F02N 11/0818* (2013.01);

(Continued)

(58) Field of Classification Search
CPC ..... B60L 1/00; B60L 3/0007; B60L 11/1868; F02N 11/0866
USPC ......................................................... 307/10.1
See application file for complete search history.

(56) References Cited

U.S. PATENT DOCUMENTS 5,243,269 A * 9/1993 Katayama et al. ............ 320/126
5,488,283 A * 1/1996 Dougherty et al. .......... 307/10.1
(Continued)

FOREIGN PATENT DOCUMENTS

DE    102010000656    9/2010
DE    102009058362    6/2011
WO    2011121053      10/2011

OTHER PUBLICATIONS

Extended European Search Report for 11194967.3 dated Jun. 5, 2012.

*Primary Examiner* — Scott Bauer
(74) *Attorney, Agent, or Firm* — Brooks Kushman P.C.

(57) ABSTRACT

An electrical power supply system for powering an electric load of a vehicle includes a main battery, a support battery and a battery control module. The battery control module includes a first terminal for connection to the main battery, a second terminal for connection to the support battery and a third terminal for connecting to the electric load. A switch is arranged between said second terminal and said third terminal. The battery control module is arranged to connect the support battery to the load by turning the switch conducting in case the voltage at the third terminal drops below a predetermined voltage. The system provides the automatic activation of a support energy source when the output voltage falls below a specified voltage threshold. The support battery supports the main battery when needed or acts as a redundant power source.

16 Claims, 2 Drawing Sheets

(51) Int. Cl.
  *F02N 11/08* (2006.01)
  *B60L 3/00* (2006.01)
  *B60L 3/04* (2006.01)
  *B60L 11/14* (2006.01)
  *B60L 11/18* (2006.01)
  *B60R 21/01* (2006.01)
  *F02N 11/10* (2006.01)

(52) U.S. Cl.
  CPC .......... *F02N 11/10* (2013.01); *F02N 2200/043* (2013.01); *F02N 2250/02* (2013.01); *Y02T 10/70* (2013.01); *Y02T 10/7005* (2013.01); *Y02T 10/7066* (2013.01); *Y02T 10/7077* (2013.01)

(56) References Cited

U.S. PATENT DOCUMENTS

| | | | |
|---|---|---|---|
| 6,600,239 B2 * | 7/2003 | Winick et al. | 307/85 |
| 8,143,855 B2 * | 3/2012 | Davis | 320/126 |
| 2011/0111268 A1 * | 5/2011 | Weng et al. | 429/50 |

* cited by examiner

POWER SUPPLY SYSTEM FOR POWERING AN ELECTRIC LOAD OF A VEHICLE

CROSS-REFERENCE TO RELATED APPLICATIONS

This application claims foreign priority benefits under 35 U.S.C. §119(a)-(d) to European patent application number EP 11194967.3, filed Dec. 21, 2011, which is incorporated by reference in its entirety.

TECHNICAL FIELD

The present disclosure relates to an electrical power supply system for powering an electric load of a vehicle, to a battery control module, and to a vehicle comprising such an electrical power supply system.

BACKGROUND

One way to save fuel in today's vehicles is the use of the so-called Automatic Start Stop function which turns off the engine each time the vehicle comes to a complete halt (such as at traffic lights) and restarts it automatically. Some relay functions in vehicles with start stop functions are impacted much more frequently than before, which places higher demands on reliability, control and diagnostics. Furthermore, very fast and high current for various sequences are required. The voltage levels of the vehicle electrical system may vary widely, which creates the risk of malfunctioning of the electronic system.

Patent application DE102010000656 describes a power supply system for a vehicle which uses two batteries. The power supply system for the vehicle has a first battery which supplies power to a starter, and a second battery with an internal resistance smaller than the first battery. A switch is arranged in a feed line between the first battery and the second battery. A power supply system control unit controls this switch. The power supply system control unit turns on the switch in the period for stopping an engine, turns off the switch element upon operating the starter, and turns on the switch element when the capacity of the second battery is less than a prescribed value during operation of an engine. In this way the electronic system is protected and always powered with sufficient power by means of the second battery. In the system of DE102010000656 both batteries are constantly charged and discharged, and this will negatively influence the lifetime of both batteries.

It is an object of the present disclosure to provide an alternative for the electrical power system described above wherein the second battery is less often used so as to increase its lifetime, which will decrease maintenance costs.

SUMMARY

According to an aspect of the embodiments disclosed herein, an electrical power supply system for powering an electric load of a vehicle comprises a main battery, a support battery and a battery control module. The battery control module comprises a first terminal for connection to said main battery, a second terminal for connection to said support battery and a third terminal for connecting to said electric load. Furthermore the module comprises a voltage comparator arranged to determine a voltage at the third terminal, and output a high output level when said determined voltage is less than a predetermined lowest voltage level. A first switch is arranged between said first terminal and said third terminal, said first switch being controllable by a first control signal. A second switch is arranged between said second terminal and said third terminal. The battery control module is arranged to connect the support battery to the load by turning the second switch conducting in case the voltage at the third terminal drops below a predetermined voltage.

The disclosed embodiments provide the automatic activation of a support energy source when the output voltage falls below a specified voltage threshold. The support battery supports the main battery when needed or acts as a redundant power source. It is purely needed as a backup battery and not used in normal situations, so charging of this battery is less frequently needed, increasing its lifetime.

In an embodiment, the battery control module is arranged to receive a second control signal and to turn said second switch conducting when receiving said second control signal. So the second switch will turn conducting when the second signal is received or when the output voltage is too low or in both situations.

In an embodiment, the second switch comprises two MOSFET devices arranged in a back-to-back configuration. MOSFET's are able to switch very fast. Furthermore, a back to back configuration results in a complete isolated support battery when the switch is open (i.e. non-conducting).

In an embodiment, if the main battery is disconnected from the system, the first switch is turned non-conducting and the second switch is turned conducting. So in case of for example a car crash, the input voltage is lost and the first switch turns non-conducting and isolates any failure. At the same time the second switch turns conductive to switch the supporting power source as a redundant power. This means that after a crash, some essential features of the car will still be powered, such as car locks.

In an embodiment, the system further comprises a pre-crash sensor arranged to detect a hazardous situation and initiate a signal to be sent to the battery control module, which upon receiving the signal turns the second switch conducting. This embodiment is advantageous in avoidance situations or pre-crash situations. In such situations the second switch will automatically activate and connect the supporting power source to help keep the voltage at a proper level.

In an embodiment, the system further comprises an electrical charger connected to the third terminal, the voltage sensor being arranged to identify when the charger is applied and turns both the first switch and the second switch conducting so as to charge both the support battery and the main battery simultaneously. So only one charger is needed for charging both batteries at the same time.

In an embodiment, the battery control module further comprises a fourth terminal connected to said main battery via a power line and connected to the third terminal via a third switch, wherein during a standard stop/start event the main battery is separated from the third terminal (i.e. the vehicle load) by turning the first and third switch non-conducting so as to only feed a starter motor, at least in use connected to the fourth terminal, while at the same time the support battery is connected to the third terminal by turning the second switch conducting to feed the vehicle load. This embodiment provides full functionality of the vehicle during cranking and also enables cranking while the vehicle moves in e.g. coastal mode.

According to an aspect of the disclosure there is provided a battery control module for use in a system as described above.

According to a further aspect, there is provided a vehicle comprising an electric power supply system as described above.

BRIEF DESCRIPTION OF THE DRAWINGS

The embodiments disclosed herein will be further described below by way of example only and with reference to the accompanying drawing, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
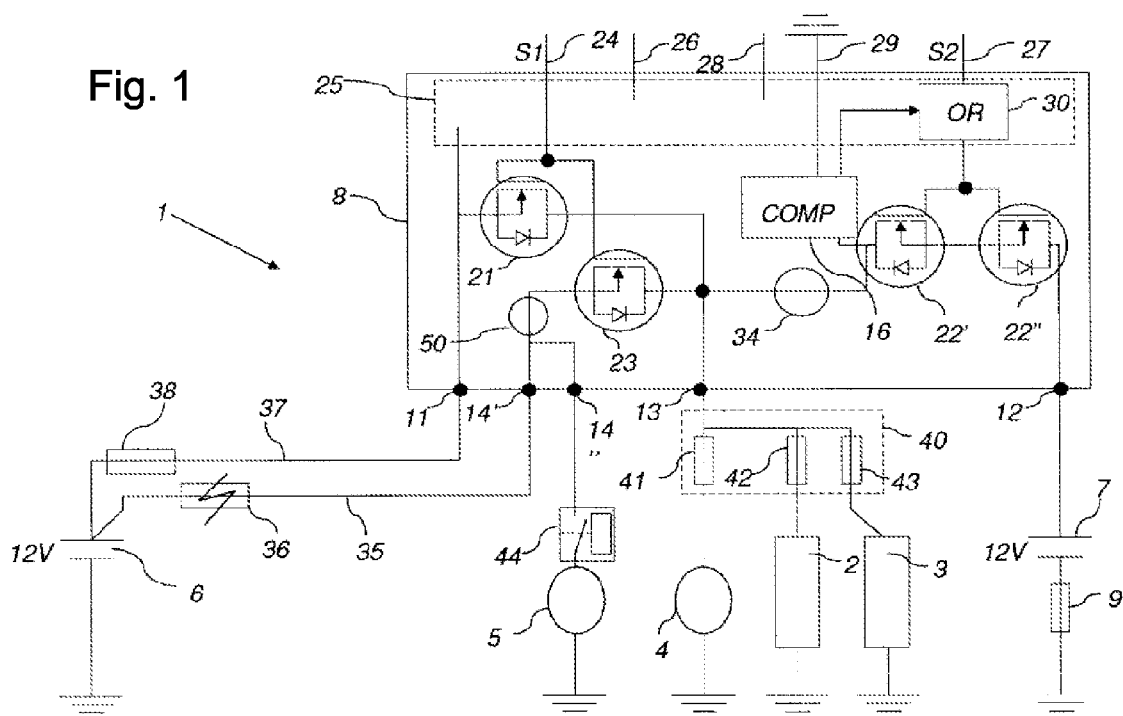
FIG. 1 is a schematic diagram of an electrical power supply system according to an embodiment of the present disclosure.

FIG. 1 is a schematic diagram of an electrical power supply system 1 connected to a vehicle load 2, an EPAS 3 and an alternator 4. Furthermore, a start motor 5 is shown which is also connected to the supply system 1. In the embodiment of FIG. 1, the electrical power supply system 1 comprises a main battery 6, a support battery 7 and a battery control module 8. The battery control module 8 comprises a first terminal 11 for connection to the main battery 6, a second terminal 12 for connection to the support battery 7 and a third terminal 13 for connecting to the electric load 2 and EPAS 3. A voltage comparator 16 is arranged to determine a voltage level at the third terminal 13, and output a high output level when said determined voltage is less than a predetermined lowest voltage level. A first switch 21 is arranged between the first terminal 11 and the third terminal 13, which is also referred to as output terminal 13. The first switch 21 is controlled by a first control signal Si at a signal interface input 24. A second switch 22 is arranged between the second terminal 12 and the third terminal 13. In this embodiment a third switch 23 is present connecting the third terminal 13 to a fourth terminal 14 when in a conducting state. This third switch 23 is also controlled by the signal S1.

The battery control module 8 also comprises a microprocessor 25 arranged to receive signals from a Line-IN (LIN) 26, and an S2 signal, see signal interface input 27. In this embodiment, the microprocessor 25 is powered by a feed line 28 connected to a power source, e.g. a 12V DC source. The signal interface input 29 indicates a connection to ground. The microprocessor comprises a unit 30 which is a logical OR port 30 receiving first input from the voltage comparator 16 and as a second input the signal S2.

In the embodiment of FIG. 1, the switch 22 comprises 2 MOSFET transistors 22' and 22" connected back-to-back. Parallel to each of the two MOSFET transistors 22', 22" a diode is arranged. Furthermore, the battery control module comprises a current sensor 34 arranged to measure a current flowing through the switch 22 when being in a conducting state.

The main battery is connected via a power line 35 to the fourth terminal in which a pyrotechnic device 36 is arranged. This pyrotechnic device 36 is activated in case of a short circuit so as to disconnect the main battery from the vehicle load 2, 3 connected to the third terminal 13. Parallel to the power line 35 is a line 37 which comprises a fuse 38. FIG. 1 also shows a fuse box 40 comprising a number of fuses 41, 42, 43. The reference number 44 indicates a solenoid switch arranged to connect and disconnect the starter from the fourth terminal 14. Please note that terminals 14' and 14" are depicted as two terminals, while they could be regarded as one terminal 14.

According to an embodiment, the battery control module 1 is arranged to connect support battery 7 to the load 2, 3 by turning the second switch 22 conducting in case the voltage ($V_{out}$) at the third terminal drops below a predetermined voltage ($V_{low}$). Both voltage comparator 16 and the logical-OR unit 30 are implemented by hardware, allowing a very fast switching of the second switch 22 and thus a very fast activation of the support battery 7 once the output voltage $V_{out}$ falls below the specified voltage threshold $V_{low}$. The support battery 7 supports the main battery 6 when needed or acts as a redundant power source. It is purely needed as a backup battery and it is not used in normal situations. As a consequence, charging of the support battery 7 is less frequently needed as compared to the known systems, which will increase its lifetime and lower maintenance costs.

The solution presented enables the voltage level in the vehicle to stay in a range where performance can be met e.g. for steering and braking Any kind of transient high electrical loads in the vehicle may be handled.

In an embodiment, a pre-crash sensor (not shown) is arranged to initiate a high S2 signal so as to turn the second switch 22 conducting. This will result in a proactive connection of the support battery 7 to the loads 2, 3 which is advantageous in for a fast activation of the electrical power steering (i.e. EPAS 3), the brake system or an electrical safety belt. By switching the second switch on time and automatically connecting the support battery 7, it will help to keep the output voltage at a proper level to avoid malfunctioning of the electrical system.

In an embodiment, the support battery 7 acts as a redundant power source if a situation occurs that disconnects the main battery from the vehicle, like e.g. in a crash. If the input voltage at terminal 11 and 14 is lost, the switches 21, 23 turn non-conducting and isolate any failure. At the same time switch 22 turns conductive to switch the supporting power source 7 as a redundant power. Preferably the switches 21, 23 measure voltage internally and thereby detecting loss of primary power supply terminal 11 and 14. This information is communicated to the microprocessor 25 which, in this case generates the signal S2 so that the second switch 22 turns conducting and the support battery 7 is connected to the vehicle load 2, 3.

The battery control module also acts as switching device between the two power sources as a standard stop/start vehicle and can be used to fulfill system safety requirements in coasting scenarios due to its fast reaction. During a standard Stop/Start event the main battery 6 is separated from the vehicle load 2, 3 by the switch 21, 23 to feed only the starter motor 5. At the same time the support battery 7 is connected to the vehicle by switch 22 to feed the electrical loads 2, 3 of the vehicle. This will keep full functionality of the vehicle during cranking (in non stop/start vehicles loads such as steering, lights and infotainment are shut off during crank) thus enables cranking while the vehicle moves. Also the system will be able to handle transient events described above when the alternator is not operating for example if the engine is turned off while the vehicle is still moving, e.g. coasting.

The battery control module 1 solves the issue of using double chargers or one at the time. A voltage sensor, e.g. voltage sensor 50, is active to identify when a charger is applied and switches the switch 22 to conductive state and charges both batteries 6, 7 simultaneously.

When the high voltage at terminal 14 disappears, the switch 22 will open again, separating the two batteries 6 and 7 to avoid the batteries from cycle each other.

By connecting the two MOSFET's 22' and 22" back-to-back, the two MOSFET's form a switch 22 which completely isolates the support battery 7 from the load, or from the main battery 6, when the switch 22 is turned off. That is why two back-to-back MOSFET's are preferred above only one MOSFET.

Please note that the terminal 13 is called the output terminal, but this terminal is also input for power created by the alternator 4, as will be known by the skilled person. In case of external charging, the voltage at terminal 14 is measured using sensor 50 and switch 22 is turned conductive when a high voltage is detected, resulting in a charging of the support battery 7. Current sensor 34 is arranged to continuously measure current and will detect over current. In case of detecting over current, the microprocessor 25 will close switch 22 to protect the switch.

Figure 2:
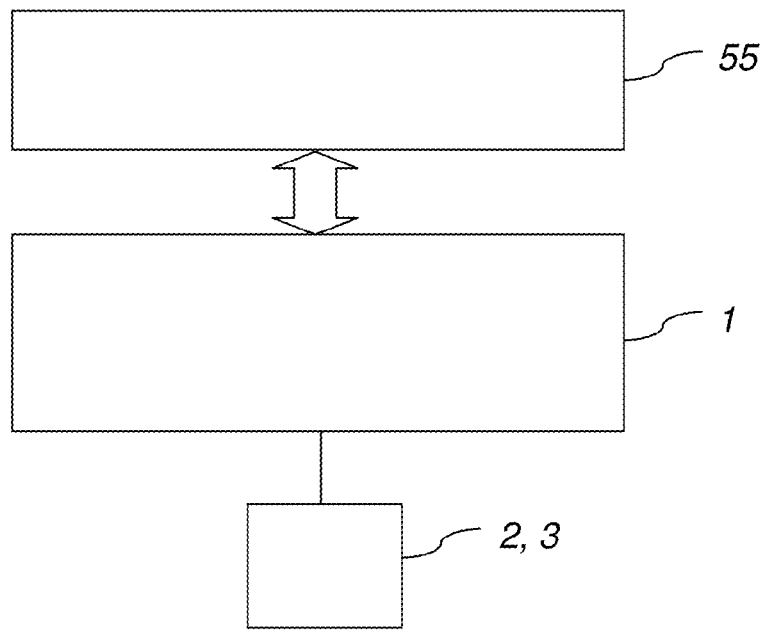
FIG. 2 schematically shows the battery control module in communication with an engine control module.

FIG. 2 schematically shows the battery control module 1 in communication with an engine control module (ECM) 55. The ECM 55 receives information from various sensors and then sends out signals to items such as fuel injectors and timing to keep the engine running at its best for performance and fuel economy. The ECM 55 also sends signals to the battery control module 1, such as the signal S1 and S2, and possibly the line-in, see 26 in FIG. 1.

Figure 3:
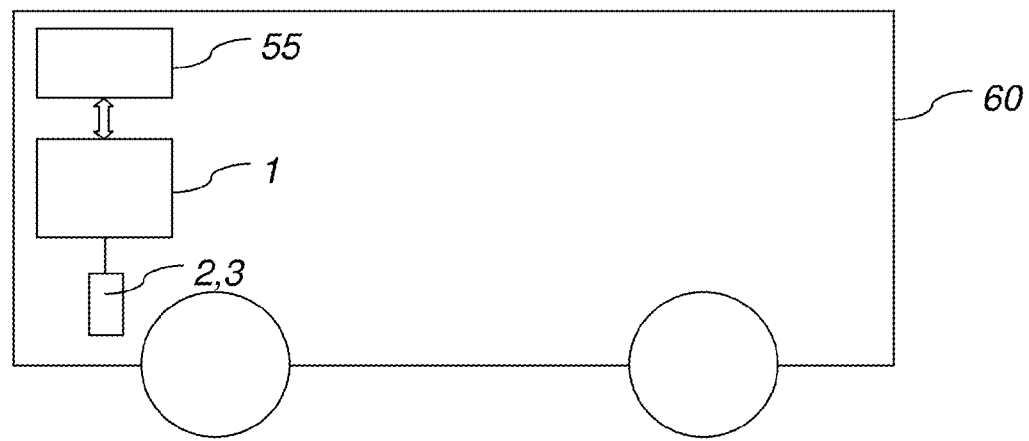
FIG. 3 schematically shows a vehicle comprising a battery control module according to an embodiment.

FIG. 3 schematically shows a vehicle 60 comprising a battery control module as described above. The present disclosure is foremost usable in regular cars and hybrids. In pure electric vehicles the need of switch 23 is eliminated (no starter motor present) but the switch 22 and the voltage comparator 16 connected to it are needed.

It is obvious to a skilled person that the present disclosure can be modified within the scope of the subsequent claims without departing from the idea and purpose described. The vehicle described above can be a car, but it may alternatively be a truck or any other vehicle having a windshield.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical power supply system for powering an electric load of a vehicle, said system comprising:
   a main battery;
   a support battery; and
   a battery control module comprising
      a first terminal for connection to said main battery,
      a second terminal for connection to said support battery,
      a third terminal for connecting to said electric load,
      a voltage comparator arranged to determine a voltage at said third terminal, and output a high output level when said determined voltage is less than a predetermined lowest voltage level,
      a first switch arranged between said first terminal and said third terminal, said first switch being controllable by a first control signal, and
      a second switch arranged between said second terminal and said third terminal;
   said battery control module being arranged to connect said support battery to said load by turning said second switch conducting in case the voltage at said third terminal drops below a predetermined voltage;
   wherein said system further comprises a pre-crash sensor arranged to detect a hazardous situation and initiate a signal to be sent to the battery control module, which upon receiving the signal turns the second switch conducting.

2. An electrical power supply system according to claim 1, wherein said battery control module is arranged to receive a second control signal and to turn said second switch conducting when receiving said second control signal.

3. An electrical power supply system according to claim 1, wherein said second switch comprises two MOSFET devices arranged in a back-to-back configuration.

4. An electrical power supply system according to claim 1, wherein if the main battery is disconnected from the system, said first switch is turned non-conducting and the second switch is turned conducting.

5. The electrical power supply system of claim 1 further comprising a vehicle.

6. An electrical power supply system for powering an electric load of a vehicle, said system comprising:
   a main battery;
   a support battery; and
   a battery control module comprising
      a first terminal for connection to said main battery,
      a second terminal for connection to said support battery,
      a third terminal for connecting to said electric load,
      a voltage comparator arranged to determine a voltage at said third terminal, and output a high output level when said determined voltage is less than a predetermined lowest voltage level,
      a first switch arranged between said first terminal and said third terminal, said first switch being controllable by a first control signal, and
      a second switch arranged between said second terminal and said third terminal;
   said battery control module being arranged to connect said support battery to said load by turning said second switch conducting in case the voltage at said third terminal drops below a predetermined voltage;
   wherein said system further comprises an electrical charger connected to said third terminal, said voltage sensor being arranged to identify when the charger is applied and turn both the first switch and the second switch conducting so as to charge both the support battery and the main battery simultaneously.

7. The electrical power supply system of claim 6 further comprising a vehicle.

8. An electrical power supply system for powering an electric load of a vehicle, said system comprising:
   a main battery;
   a support battery; and
   a battery control module comprising
      a first terminal for connection to said main battery,
      a second terminal for connection to said support battery,
      a third terminal for connecting to said electric load,
      a voltage comparator arranged to determine a voltage at said third terminal, and output a high output level when said determined voltage is less than a predetermined lowest voltage level,
      a first switch arranged between said first terminal and said third terminal, said first switch being controllable by a first control signal, and a second switch arranged between said second terminal and said third terminal;

said battery control module being arranged to connect said support battery to said load by turning said second switch conducting in case the voltage at said third terminal drops below a predetermined voltage;

said battery control module further comprising a fourth terminal connected to said main battery via a power line and connected to said third terminal via a third switch, wherein during a standard stop/start event the main battery is separated from the third terminal by turning the first and third switch non-conducting so as to only feed a starter motor, at least in use connected to the fourth terminal, while at the same time the support battery is connected to the third terminal by turning the second switch conducting to feed the vehicle load.

9. The electrical power supply system of claim 8 further comprising a vehicle.

10. An electrical power supply system for powering an electric load of a vehicle, said system comprising:
   a battery control module comprising
      a first terminal adapted for connection to a main battery,
      a second terminal adapted for connection to a support battery,
      a third terminal adapted for connection to said electric load,
      a voltage comparator configured to determine a voltage at said third terminal, and
      a switch between said second terminal and said third terminal;
   wherein said battery control module is configured to connect said support battery to said load by turning said switch to a conducting state when the voltage at said third terminal drops below a predetermined voltage;
   wherein said system further comprises a pre-crash sensor arranged to detect a hazardous situation and initiate a signal to be sent to the battery control module, which upon receiving the signal turns the second switch to a conducting state.

11. An electrical power supply system according to claim 10, wherein said battery control module is arranged to receive a control signal and to turn said switch to the conducting state upon receiving said control signal.

12. An electrical power supply system according to claim 10, wherein said switch comprises two MOSFET devices arranged in a back-to-back configuration.

13. The electrical power supply system of claim 10 further comprising a vehicle.

14. An electrical power supply system for powering an electric load of a vehicle, said system comprising:
   a battery control module comprising
      a first terminal adapted for connection to a main battery,
      a second terminal adapted for connection to a support battery,
      a third terminal adapted for connection to said electric load,
      a voltage comparator configured to determine a voltage at said third terminal, and
      a switch between said second terminal and said third terminal;
   wherein said battery control module is configured to connect said support battery to said load by turning said switch to a conducting state when the voltage at said third terminal drops below a predetermined voltage;
   wherein said battery control module further comprises another switch arranged between said first terminal and said third terminal, wherein if the main battery is disconnected from the system, said battery control module is configured to turn the another switch to a non-conducting state and to turn the switch to a conducting state; and
   an electrical charger connected to said third terminal, wherein said voltage sensor is adapted to identify when the charger is applied and in response the battery control module is configured to turn both the switch and the another switch to conducting states so as to charge both the support battery and the main battery simultaneously.

15. An electrical power supply system according to claim 14 wherein said battery control module further comprises a fourth terminal connected to said main battery via a power line and connected to said third terminal via a third switch, wherein during a standard stop/start event the battery control module is configured to separate the main battery from the third terminal by turning the another switch and the third switch to non-conducting states so as to only feed a starter motor, while at the same time connecting the support battery to the third terminal by turning the switch conducting to feed the vehicle load.

16. The electrical power supply system of claim 14 further comprising a vehicle.

* * * * *

UNITED STATES PATENT AND TRADEMARK OFFICE
CERTIFICATE OF CORRECTION

| | | |
|---|---|---|
| PATENT NO. | : 9,272,625 B2 | |
| APPLICATION NO. | : 13/721825 | |
| DATED | : March 1, 2016 | |
| INVENTOR(S) | : Mikael Sonesson et al. | |

It is certified that error appears in the above-identified patent and that said Letters Patent is hereby corrected as shown below:

Claims

Column 6, Line 31, Claim 6:

After "a third terminal for"
Delete "connecting" and
Insert -- connection --.

Signed and Sealed this
Twenty-fourth Day of May, 2016

Michelle K. Lee
*Director of the United States Patent and Trademark Office*